(12) United States Patent
Kashima et al.

(10) Patent No.: US 7,130,833 B2
(45) Date of Patent: Oct. 31, 2006

(54) CLASSIFICATION METHOD OF LABELED ORDERED TREES USING SUPPORT VECTOR MACHINES

(75) Inventors: Hisashi Kashima, Yamato (JP); Teruo Koyanagi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 10/385,268

(22) Filed: Mar. 10, 2003

(65) Prior Publication Data
US 2003/0172352 A1 Sep. 11, 2003

(30) Foreign Application Priority Data
Mar. 8, 2002 (JP) ................ 2002-64452

(51) Int. Cl.
*G06F 7/20* (2006.01)
(52) U.S. Cl. ......................................... 706/12
(58) Field of Classification Search .................. 706/12
See application file for complete search history.

(56) References Cited
U.S. PATENT DOCUMENTS 5,649,068 A * 7/1997 Boser et al. ................. 706/12
5,675,710 A * 10/1997 Lewis ........................... 706/12
5,943,669 A * 8/1999 Numata ......................... 707/5
6,192,360 B1 * 2/2001 Dumais et al. ............... 707/6
6,516,308 B1 * 2/2003 Cohen .......................... 706/12
6,976,207 B1 * 12/2005 Rujan et al. ................. 715/500

OTHER PUBLICATIONS

Harris Drucker, Donghui Wu, Vladimir N. Vapnik, "Support Vector Machines for Spam Categorization", IEEE Transactions on Neural Networks, vol. 10, No. 5, Sep. 1999.*
M. Fuller, E. Mackie, R. Sacks-Davis, R. Wilkinson, "Structured Answers for a Large Structured Document Collection", Jul. 1993, Proceedings of the 16th annual international ACM SIGIR conference on Research and development in information retrieval.*
Soumen Chakrabarti "Data mining for hypertext: A tutorial survey", Jan. 2000, ACM SIGKDD Explorations Newsletter, vol. 1 Issue 2.*

* cited by examiner

*Primary Examiner*—Anthony Knight
*Assistant Examiner*—Sergey Datskovskiy
(74) *Attorney, Agent, or Firm*—Richard Goldman

(57) ABSTRACT

To achieve classification of semistructured data with a Kernel method for labeled ordered trees, instances having a labeled ordered tree structure are input and their inner product is computed, the result of which is used for classification learning of the instances. In the inner product computation, a sum of matches is computed for descendant nodes of non-leaf nodes of the labeled ordered trees by applying dynamic programming based on correspondence in which order of the nodes is maintained.

11 Claims, 14 Drawing Sheets

(A)

(B)

[Figure 1]
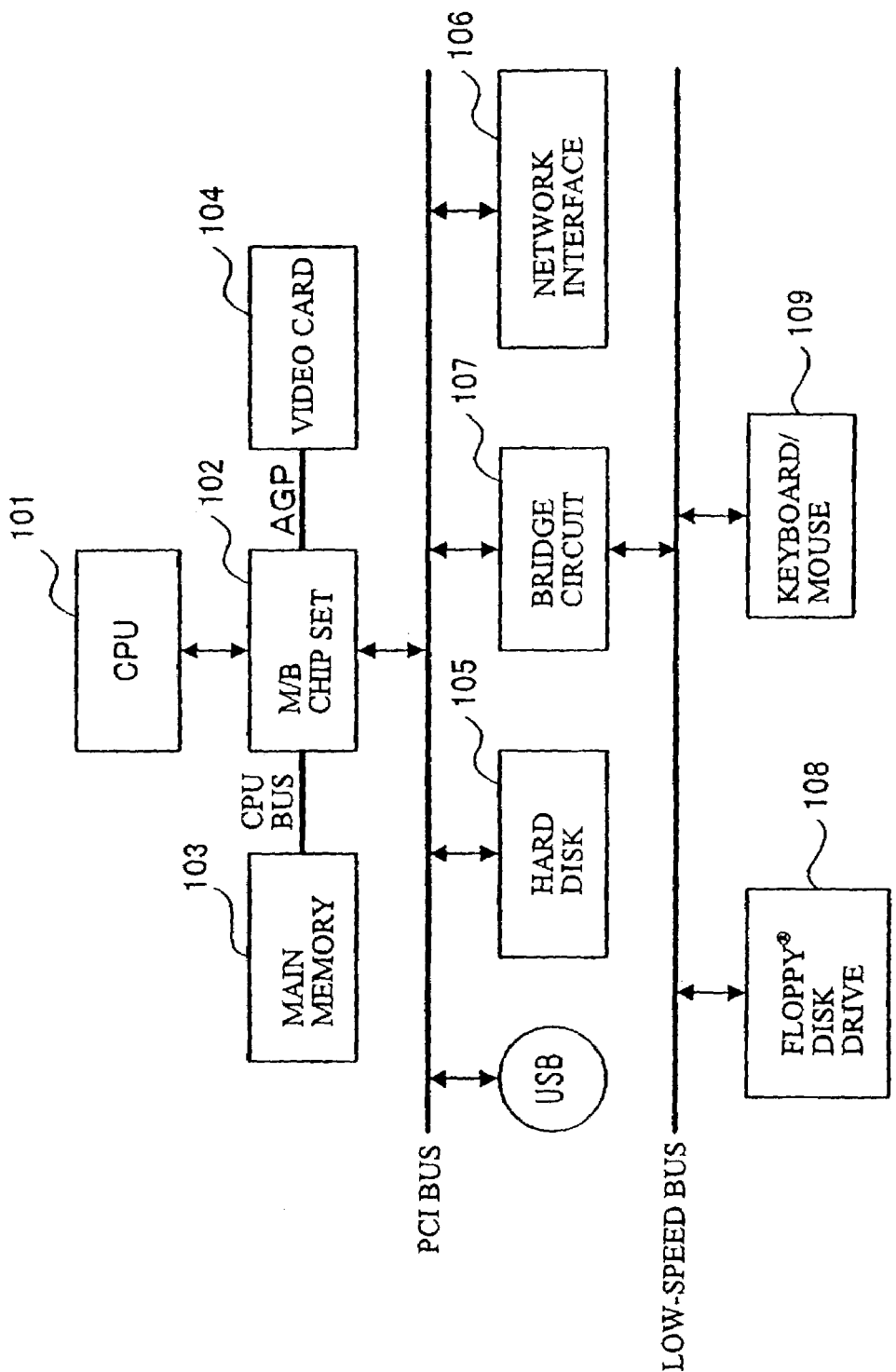

[Figure 2]
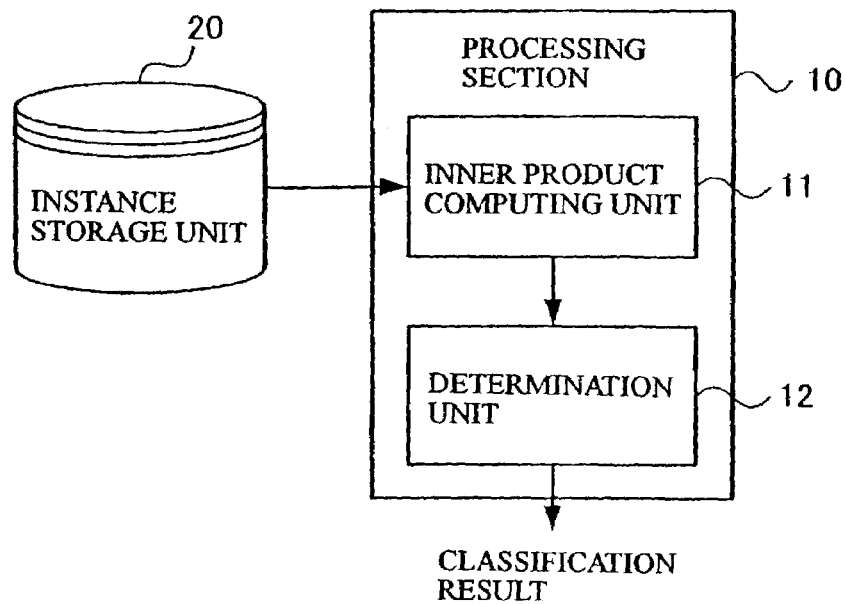
[Figure 3]
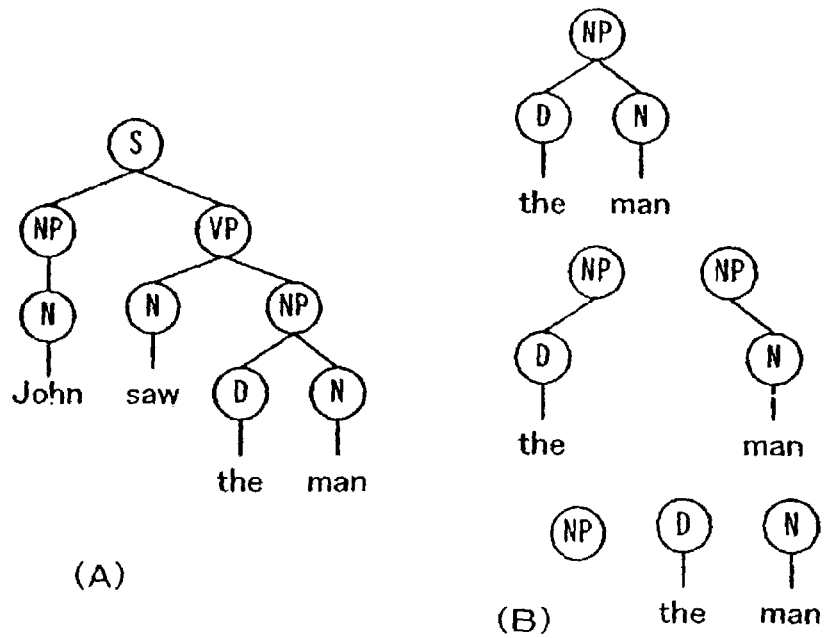

[Figure 4]
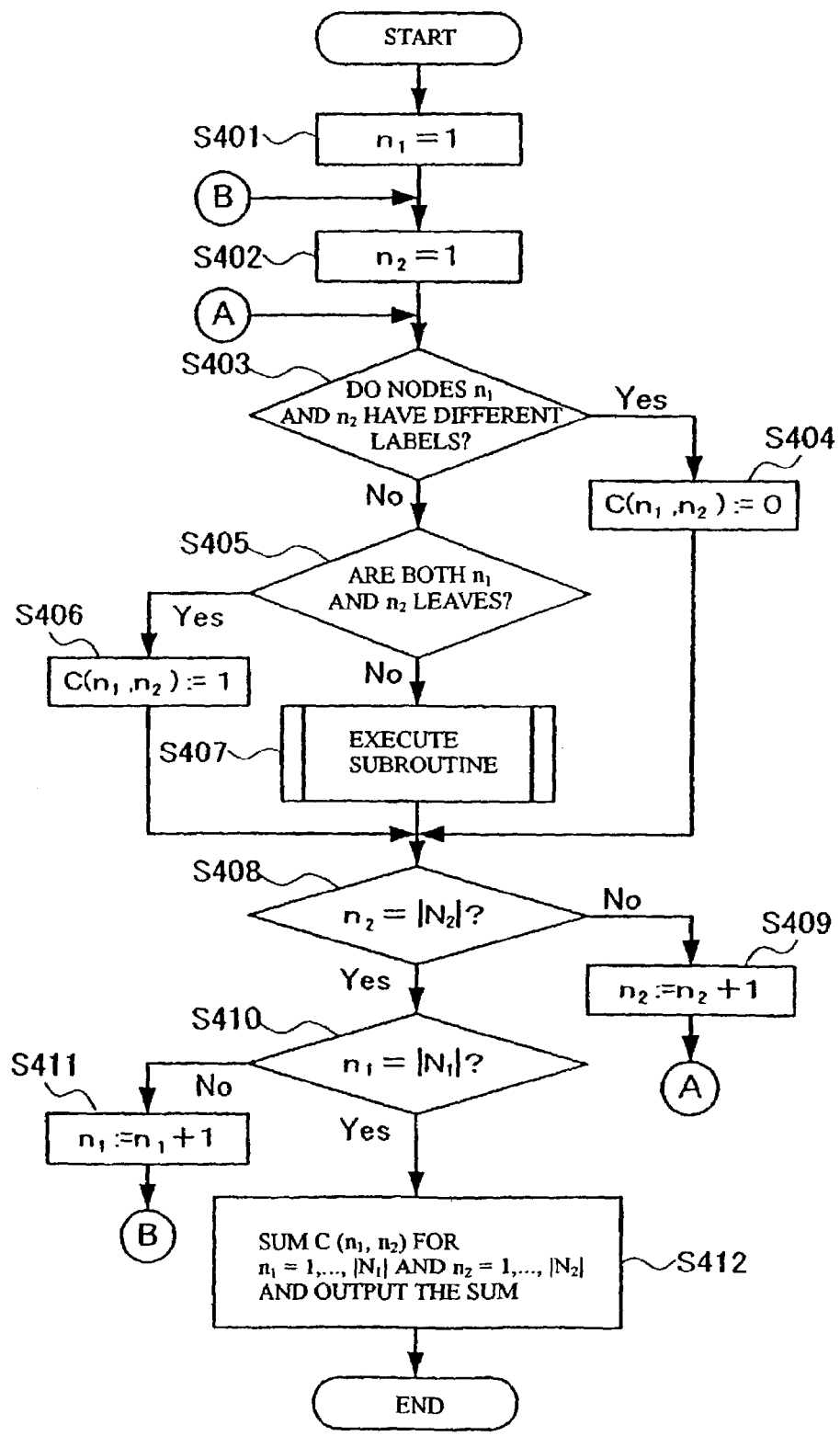

[Figure 5]
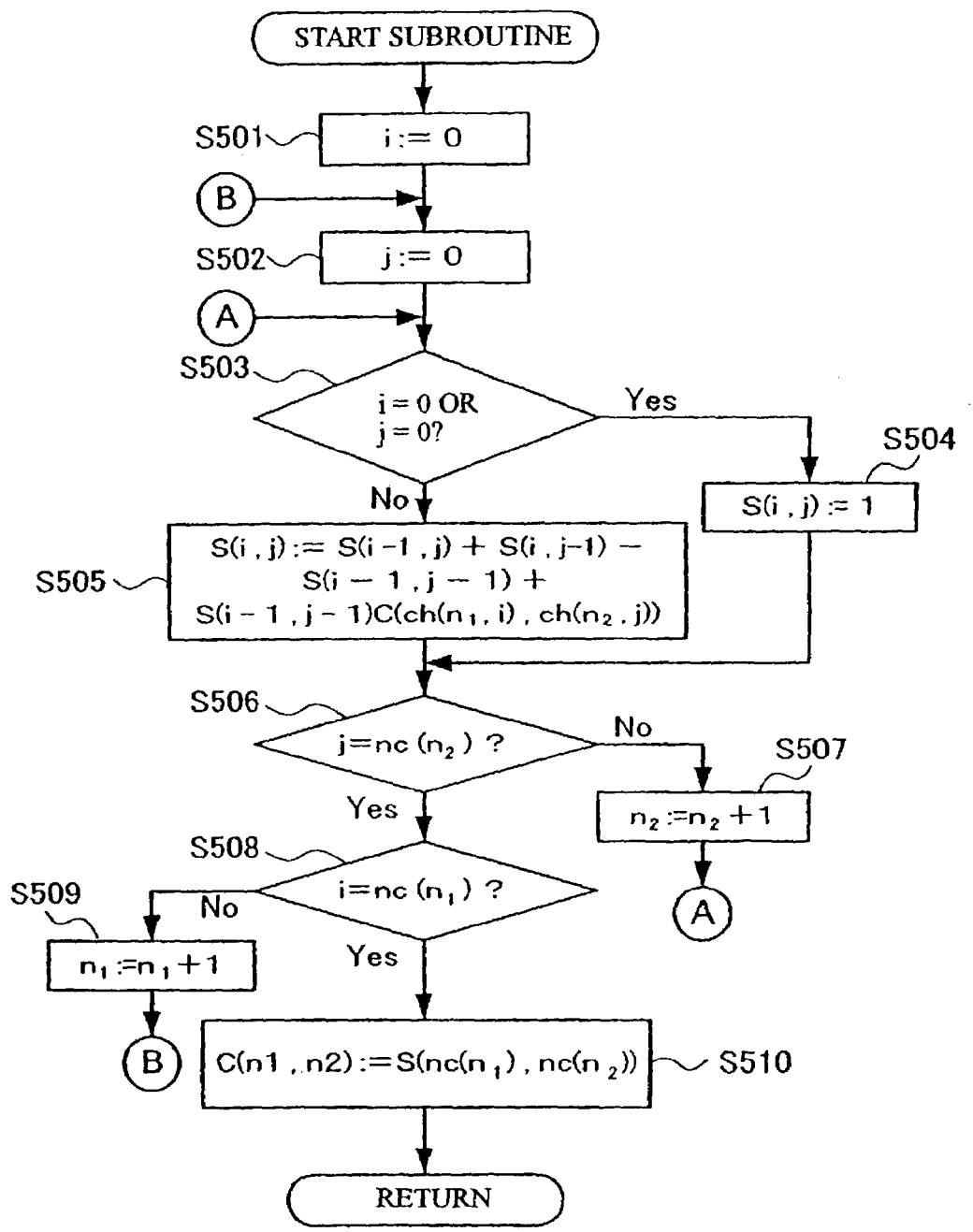

[Figure 6]

```
Tree_Kernel (T₁, T₂):
for n₁=1,..., |N₁|,
   for n₂=1,..., |N₂|,
      if labels at n₁ and n₂ are distinct,
         C(n₁, n₂) := 0
      else if both n₁ and n₂ are leaves,
         C(n₁, n₂) := 1
      else,
         for i=0,..., nc(n₁)
            for j=0,..., nc(n₂)
               if i=0 or j=0
                  S(i, j) := 1
               else,
                  S(i, j) := S(i-1, j) + S(i, j-1) - S(i-1, j-1)
                           + S(i-1, j-1) · C(ch(n₁, i), ch(n₂, j))
               end_if
            end_for
         end_for
         C(n₁, n₂) := S(nc(n₁), nc(n₂))
      end_if
   enf_for
end_for return $\sum_{n_1=1}^{|N_1|} \sum_{n_2=1}^{|N_2|} C(n_1, n_2)$
```

[Figure 7]
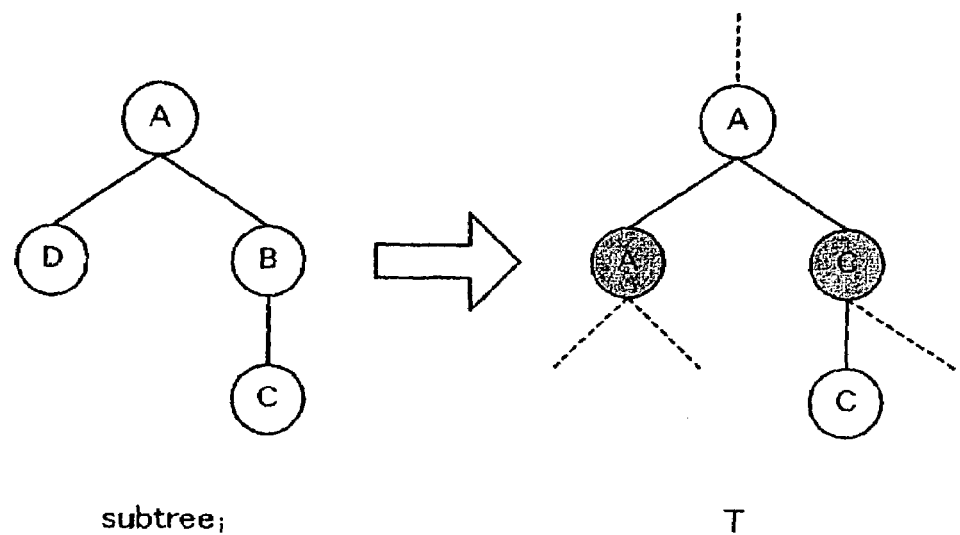

[Figure 8]

```
Tree_Kernel (T₁, T₂) :
for n₁=1, ..., |N₁|,
  for n₂=1, ..., |N₂|,
    if if both n₁ and n₂ are leaves,
      C (n₁, n₂) :=Sim (n₁, n₂)
    else,
      for i=0, ..., nc (n₁)
        for j=0, ..., nc (n₂)
          if i=0 or j=0
            S (i, j) :=1
          else,
            S (i, j) :=S (i-1, j) +S (i, j-1) -S (i-1, j-1)
              +S (i-1, j-1) ·C (ch (n₁, i), ch (n₂, j))
          end_if
        end_for
      end_for
      C (n₁, n₂) :=
        Sim (n₁, n₂) ·S (nc (n₁), nc (n₂))
    end_if
  enf_for
end_for
return Σ|N₁|_{n₁=1} Σ|N₂|_{n₂=1} C (n₁, n₂)
```

[Figure 9]
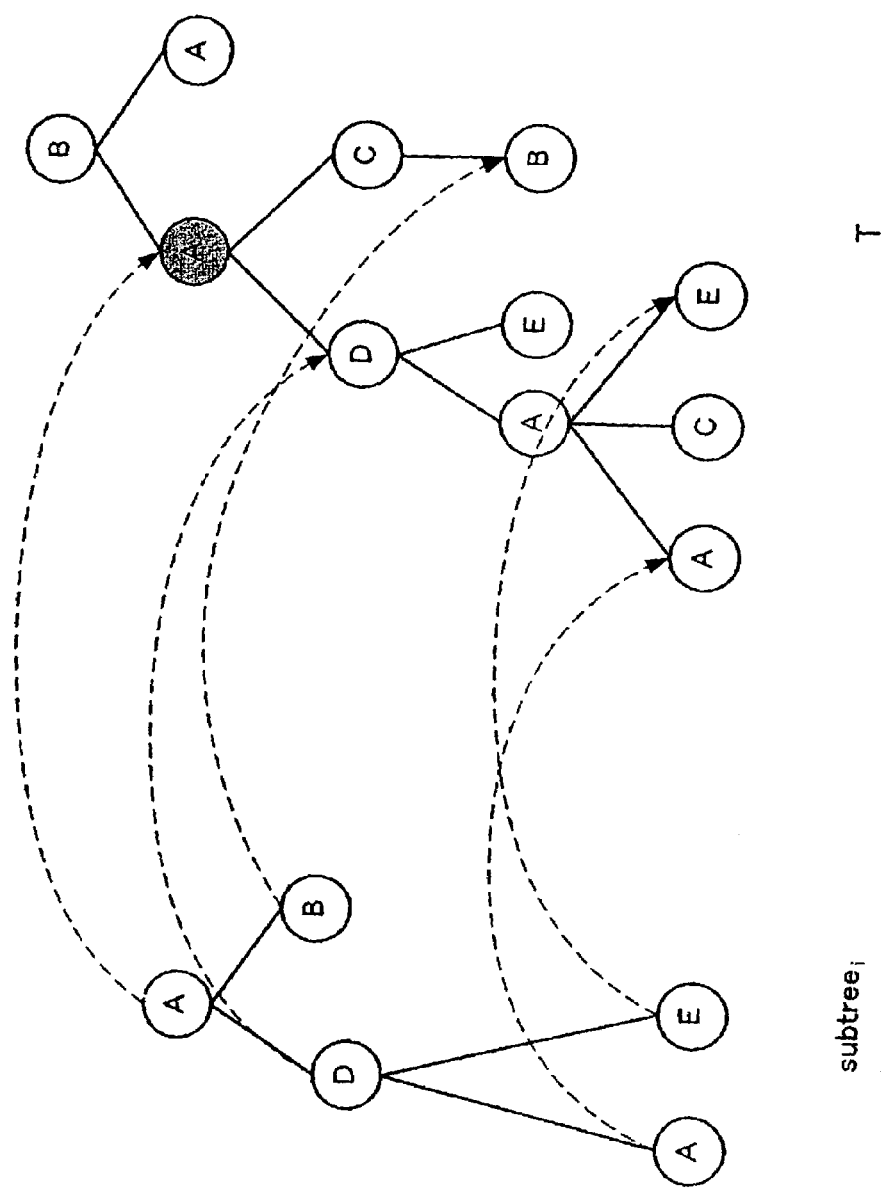

[Figure 10]

```
Tree_Kernel (T₁, T₂) :
for n₁=1,..., |N₁|,
   for n₂=1,..., |N₂|,
      if if both n₁ and n₂ are leaves,
         C(n₁, n₂) :=Sim(n₁, n₂)
      else,
         for i=0,..., nc(n₁)
            for j=0,..., nc(n₂)
               if i=0 or j=0
                  S(i, j) :=1
               else,
                  S(i, j) :=S(i-1, j) +S(i, j-1) -S(i-1, j-1)
                        +S(i-1, j-1) ·C(ch(n₁, i), ch(n₂, j))
               end_if
            end_for
         end_for
         C(n₁, n₂) :=
            Sim(n₁, n₂) ·S(nc(n₁), nc(n₂))
         Ca(n₁, n₂) :=C(n₁, n₂)

+Σ$_{j=1}^{nc(n2)}$ Ca(n₁, ch(n₂, j))

+Σ$_{i=1}^{nc(n1)}$ Ca(ch(n₁, i), n₂)

+Σ$_{j=1}^{nc(n2)}$ Σ$_{i=1}^{nc(n1)}$ Ca(ch(n₁, i), ch(n₂, j))
      end_if
   enf_for
end_for
return Σ$_{n_1=1}^{|N_1|}$ Σ$_{n_2=1}^{|N_2|}$ C(n₁, n₂)
```

[Figure 11]
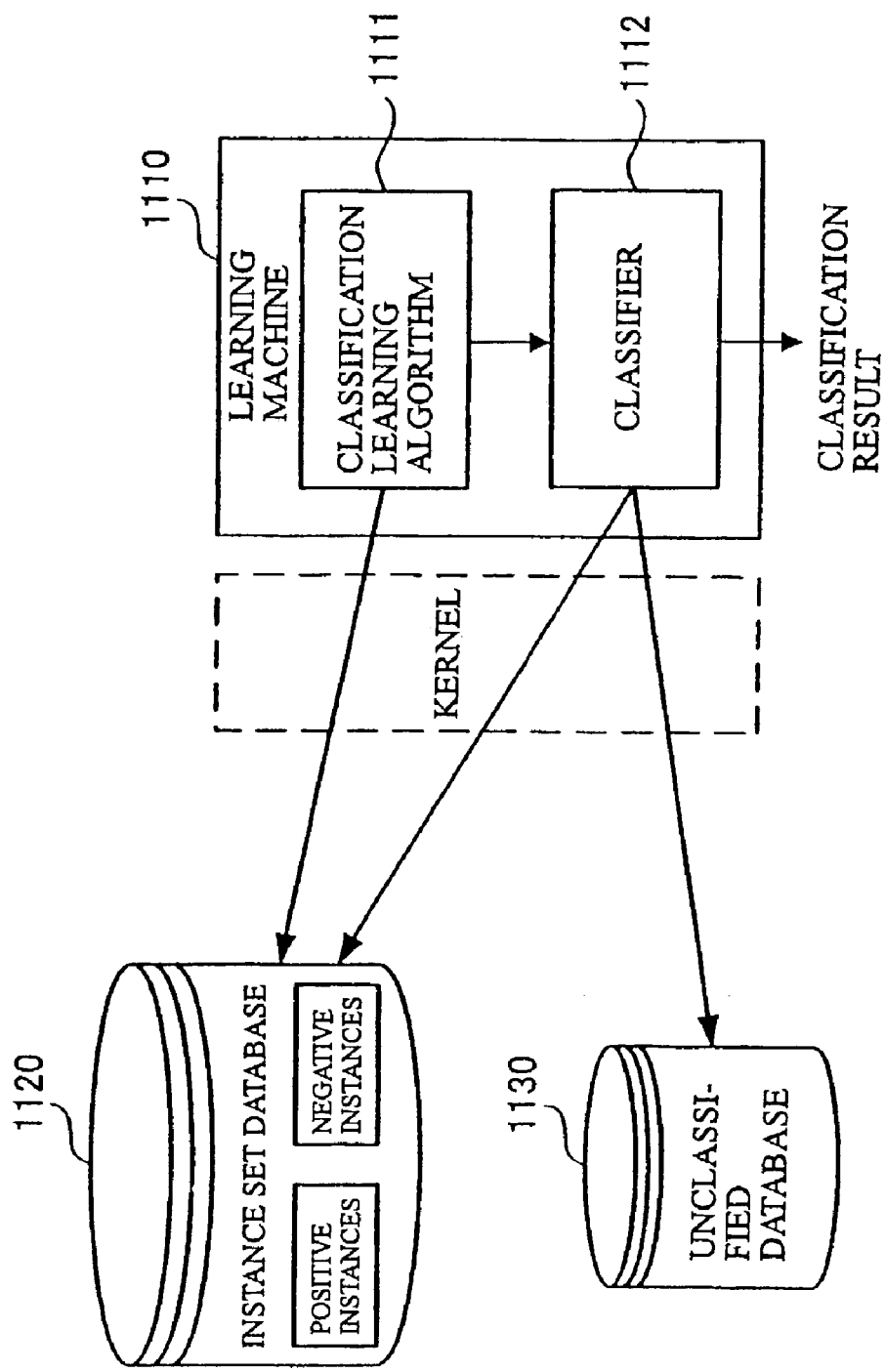

[Figure 12]
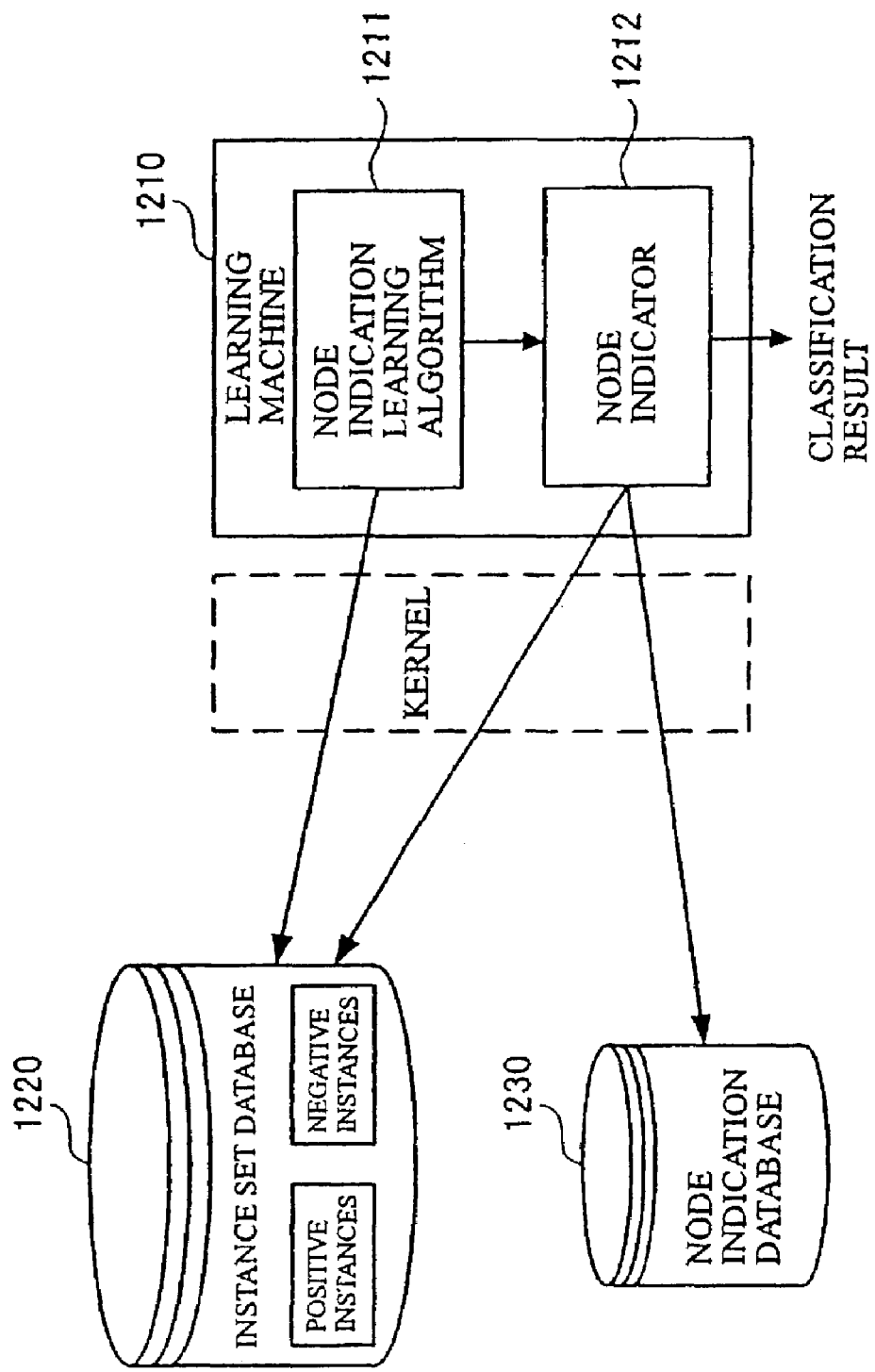

[Figure 13]
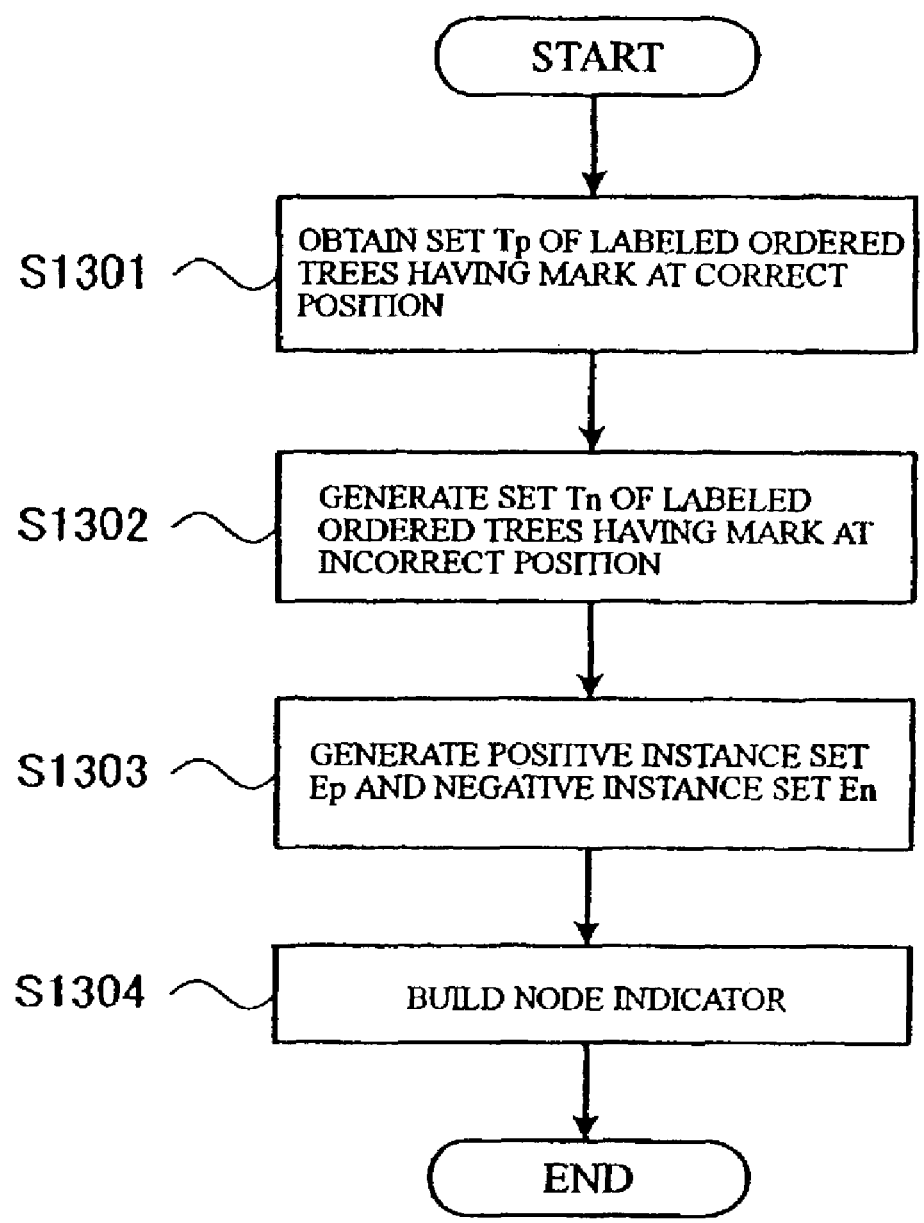

[Figure 14]
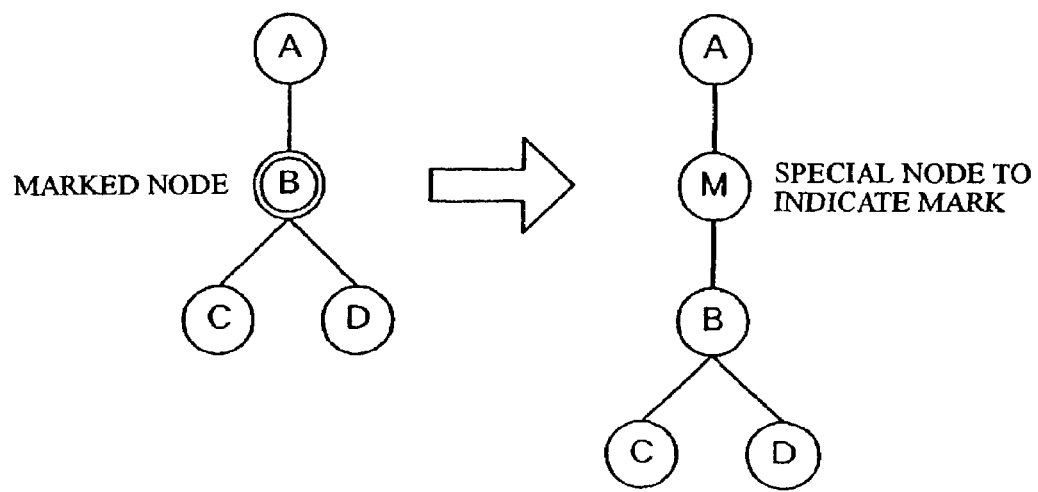

[Figure 15]
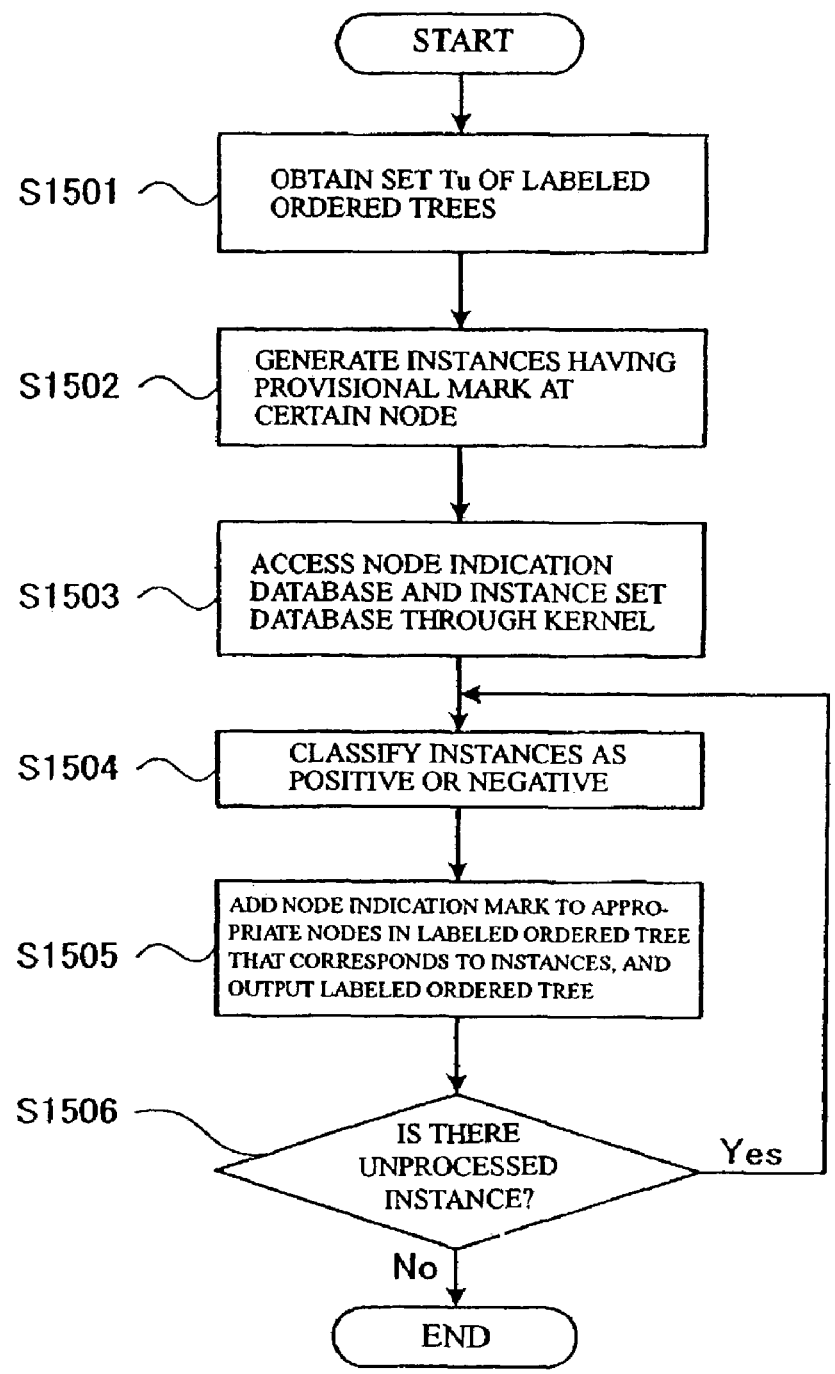

CLASSIFICATION METHOD OF LABELED ORDERED TREES USING SUPPORT VECTOR MACHINES

BACKGROUND OF THE INVENTION

1. Field of the Invention

This invention relates to a technique of classifying semistructured data such as XML (Extensible Markup Language) or HTML (Hypertext Markup Language) data.

2. Related Art

In recent years, semistructured data such as XML or HTML data is attracting attention as data formats for use in various databases and data exchanges, and developing various data mining techniques for the semistructured data is becoming an important issue.

Now, consider the basis of data mining, which is Supervised Learning (Classification Learning) for classifying instances having a structure (the above mentioned semistructured data) into two classes.

Supervised Learning in this context is to learn a classifier, such that, given a set of instances that belong to either of two classes (called a positive class and a negative class), the classifier correctly classifies a new instance into the positive class or the negative class when it is not known which class the new instance belongs to. The instances that belong to the positive class are called positive instances, and the instances that belong to the negative class are called negative instances.

Generally, Supervised Learning involves representing an instance as a point (vector) in a feature space. Learning the classifier is to determine a rule (a set of separating planes) for appropriately classifying a set (point set) of positive instances and negative instances in the feature space (more properly, classifying unknown points yet to be given).

If an instance is easily represented as a vector, in other words, if its attribute required for classification (basis of the feature space) can humanly be determined, the attribute may be simply passed to various learning algorithms. However, an instance having a structure, i.e., an instance represented as an array, tree, graph, and so on, cannot be directly represented as a vector. In many of such cases, it may be effective to define substructures of the instance as its attributes. For example, a chemical compound can be represented as a graph, and its activity can be determined (to some extent) from the stacked substructures.

The above mentioned semistructured data can be modeled as a labeled ordered tree. One strategy of Supervised Learning for processing instances having such a structure is Relational Learning. Relational Learning defines basic relations between elements, and these relations form substructures. The substructures, used as attributes, are constructed successively as the learning proceeds. However, the problem of searching an optimal hypothesis would be NP hard in general, thereby resorting to a heuristic searching approach. The following reference 1, for example, describes Relational Learning in detail.

Reference 1: Furukawa, Ozaki, Ueno. Kinou-ronri Programming. Kyoritsu shuppan, 2001

Another strategy of Supervised Learning for processing instances having a structure is to find partial patterns, define frequent patterns as attributes, and pass them to a standard learning algorithm. This approach has an advantage that it can process data that has no class information. However, the steps of finding the patterns would be again NP hard in most cases.

Thus, these two approaches do not assure that processing will be completed in polynomial time in view of computational complexity.

Now, there is a practical approach to Supervised Learning for processing instances having a complex structure like a tree structure, which uses a Kernel method such as Support Vector Machine. The following reference 2, for example, describes Support Vector Machine in detail.

Reference 2: V. Vapnik. The Nature of Statistical Learning Theory. Springer Verlag, 1995.

One of the important features of the Kernel method is accessing instances using a Kernel. While common learning algorithms directly access a vector representation of an instance, the Kernel method involves accessing through the inner product of vector representations of two instances. Therefore, given an efficient way of computing the inner product of vector representations, the dimension of the vector representations does not appear explicitly in the computational complexity of learning and classification processes, however high the dimension is. The function that provides the inner product is called a Kernel, with which the Kernel method can realize efficient learning.

As described above, the Kernel method enables building a system that is feasible for learning with instances having a structure. Therefore, to perform data mining of semistructured data such as XML or HTML data, it is necessary to obtain the Kernel for labeled ordered trees that represent such a structure.

There have been proposed some Kernels that use all possible substructures as attributes. The following reference 3 discloses a Kernel for syntactic analysis trees of natural language sentences.

Reference 3: M. Collins and Nigel Duffy. Parsing with a Single Neuron: Convolution Kernel for Natural Language Problems. unpublished, 2000.

The method disclosed in the above literature uses the number of appearances of each subtree in a syntactic analysis tree as an attribute for a vector representation of the syntactic analysis tree. Here, because the number of subtrees appearing in one syntactic analysis tree exponentially increases with the size of the tree, explicitly counting the number would be problematic in view of computation time. Therefore, this method proposes recursively computing a vector representation of two trees without counting the number of subtree appearances one by one.

However, the trees that can be processed by the Kernel described in the reference 3 is limited to those like a syntactic analysis tree, in which child nodes can identify each other in a set of child nodes of a certain node. Therefore, the method cannot be applied to a general tree like a labeled ordered tree.

Thus, this invention proposes a Kernel method for a labeled ordered tree, and the object of this invention is to realize classification of semistructured data with this Kernel method.

SUMMARY OF THE INVENTION

To achieve the above object, this invention is implemented as a data processing method for controlling a computer to learn classification of instances having a structure, the method comprising: a first step of inputting the instances to compute their inner product and storing the computation result in memory, the structure of the instances being vector-representable with its substructures as attributes; and a second step of learning classification of the instances based on the computation result stored in the memory;

wherein the first step comprises, if the given substructures includes lower substructures, computing a sum of matches for the lower substructure.

More specifically, the first step comprises, if the given substructures includes lower substructures, computing a sum of complete matches for the lower substructure by applying dynamic programming based on order in the lower substructures, which is information specific to the lower substructure, according to correspondence in which the order is maintained.

This invention is also implemented as a data processing method for controlling a computer to learn classification of instances having a labeled ordered tree structure, the method comprising: a first step of inputting the instances to compute their inner product and storing the computation result in memory; and a second step of learning classification of the instances based on the computation result stored in the memory; wherein the first step comprises, if a node in the tree is not a leaf node, computing a sum of matches for descendant nodes of the node.

More preferably, the first step comprises, when computing the sum of matches for the descendant nodes of the node, determining that the descendant nodes match even if their labels are different from corresponding nodes. Alternatively, it comprises determining that the descendant nodes match if relative positions between corresponding nodes are maintained.

This invention is also implemented as a data processing method for controlling a computer to indicate a desired node in a labeled ordered tree, the method comprising the steps of: based on structures of positive instances and negative instances stored in memory, obtaining a classification rule for classifying the positive instances and the negative instances and storing the rule in memory, each structure of the positive instances being the labeled ordered tree in which a node indication mark is added to a node to be indicated, and each structure of the negative instances being the labeled ordered tree in which a node indication mark is added to a node not to be indicated; adding a node indication mark to a node in the labeled ordered tree to be processed and classify the labeled ordered tree as positive or negative based on the classification rule stored in the memory; and, in response to the classification result, outputting a processing result of the labeled ordered tree with the node indication mark added to a node.

More specifically, the step of obtaining the classification rule and storing it in the memory comprises the steps of: inputting the labeled ordered trees to compute their inner product and storing the computation result in memory; and obtaining the classification rule for the labeled ordered trees with the computation result stored in the memory.

This invention is also implemented as a data processing method for controlling a computer to compute an inner product of labeled ordered trees, the method comprising: a first step of matching leaf nodes of the labeled ordered trees and storing the result in memory; a second step of matching non-leaf nodes of the labeled ordered trees by computing a sum of matches for descendant nodes of the non-leaf nodes and storing the result in memory; and a third step of computing the inner product of the labeled ordered trees based on the matching results of the first and second steps stored in the memory.

More specifically, the second step comprises computing a sum of matches for the descendant nodes by applying dynamic programming according to correspondence in which order of the nodes is maintained.

Another implementation of the invention for achieving the above object is an information processing system for classifying data having a labeled ordered tree structure, the system comprising:

an instance storage unit that stores instances of the data classified as positive instances and negative instances based on the tree structure; a processing unit that reads the instances from the instance storage unit to perform classification and classification learning of the instances with a Kernel method; wherein the processing unit comprises an inner product computing unit that computes a sum of matches for descendant nodes of non-leaf nodes of the trees when computing an inner product of the instances.

More specifically, the inner product computing unit computes a sum of matches for the descendant nodes by applying dynamic programming according to correspondence in which order of the descendant nodes is maintained.

The invention is also implemented as a program for controlling a computer to cause the computer to execute the steps of the above described data processing methods or to function as the above described information processing system. The program can be stored in and distributed as a magnetic disk, optical disk, semiconductor memory, or other storage media, or distributed via a network.

BRIEF DESCRIPTION OF THE DRAWINGS

FIG. 1 is a schematic diagram of a hardware configuration of a computer suitable for implementing an information processing system according to an embodiment;

FIG. 2 illustrates a configuration of the information processing system according to the embodiment;

FIG. 3 illustrates a relation between a syntactic analysis tree and its subtrees;

FIG. 4 is a flowchart describing a routine to compute an inner product of vector representations of labeled ordered trees according to the embodiment;

FIG. 5 is a flowchart describing processing in a subroutine at step 407 of FIG. 4;

FIG. 6 illustrates an algorithm to compute a Kernel for two labeled ordered trees according to the embodiment;

FIG. 7 describes correspondence between subtrees in a first variation that expands the embodiment;

FIG. 8 illustrates an algorithm to compute a Kernel that allows for label differences according to the first variation;

FIG. 9 describes correspondence between subtrees in a second variation that expands the embodiment;

FIG. 10 illustrates an algorithm to compute a Kernel that allows for structural extension according to the second variation;

FIG. 11 illustrates an exemplary configuration of a learning machine according to the embodiment;

FIG. 12 illustrates an exemplary configuration of a learning system for building a node indicator that indicates a particular node of a labeled ordered tree according to the embodiment;

FIG. 13 is a flowchart describing operation in a learning phase of the learning machine illustrated in FIG. 12;

FIG. 14 describes how to generate an instance used for learning and classification from a labeled ordered tree having a node indication mark; and FIG. 15 is a flowchart describing operation performed by the node indicator built with the procedure of FIG. 13.

DESCRIPTION OF THE PREFERRED EMBODIMENTS

Now, the invention will be described in detail based on an embodiment illustrated in appended drawings.

FIG. 1 shows a schematic diagram of a hardware configuration of a computer suitable for implementing an information processing system according to this embodiment.

The computer shown in FIG. 1 includes a CPU (Central Processing Unit) 101 as operating means; main memory 103 connected to the CPU 101 via a M/B (motherboard) chip set 102 and a CPU bus; a video card 104 also connected to the CPU 101 via the M/B chip set 102 and an AGP (Accelerated Graphics Port); a hard disk 105 and a network interface 106 connected to the M/B chip set 102 via a PCI (Peripheral Component Interconnect) bus; and a floppy disk drive 108 and a keyboard/mouse 109 connected to the M/B chip set 102 through the PCI bus via a bridge circuit 107 and a low-speed bus such as an ISA (Industry Standard Architecture) bus. Although not shown in FIG. 1, the computer also includes a clock generator and its controller as means for controlling operation performance (operation clock) of the CPU 101 as will be described below.

It is noted that FIG. 1 is a mere illustration of a hardware configuration of a computer for realizing the embodiment, and various other configurations to which the embodiment can be applied may also be employed. For example, only video memory may be provided instead of the video card 104, in which case the CPU 101 processes image data. Further, a sound mechanism may be provided for voice input/output, or a CD-ROM (Compact Disc Read Only Memory) drive or a DVD-ROM (Digital Versatile Disc Read Only Memory) drive may be provided via an interface such as ATA (AT Attachment).

FIG. 2 describes a configuration of the information processing system according to this embodiment.

Referring to FIG. 2, the information processing system in this embodiment includes a processing section 10 that performs classification and classification learning of instances (labeled ordered trees), and an instance storage unit 20 that stores instances for learning conducted by the processing section 10.

In FIG. 2, the processing section 10 is implemented in the program-controlled CPU 101, for example. The program that controls the CPU 101 is stored in and distributed as a magnetic disk, optical disk, semiconductor memory, or other storage media, or distributed via a network, and it is read into the main memory 103. The instance storage unit 20 is also implemented in the main memory 103. It will be understood that the program and instances stored in the main memory 103 may recede in an external storage unit such as the hard disk 105 as needed.

In this embodiment, the processing section 10 includes an inner product computing unit 11 that computes an inner product of two certain labeled ordered trees, and a determination unit 12 that classifies the two labeled ordered trees based on their inner product computed by the inner product computing unit 11. The inner product computing unit 11 and the determination unit 12 are virtual software blocks implemented as functionality of the processing section 10 (CPU 101) by the above mentioned program control.

The inner product computing unit 11 computes the inner product of two certain instances stored in the instance storage unit 20 in response to a request from the determination unit 12 and passes the inner product to the determination unit 12. This computation is performed at any time in the process of instance classification learning conducted by the determination unit 12, as well as at the time of classification of an unclassified instance. The inner product computing unit 11 in this embodiment efficiently computes the inner product of the labeled ordered trees using the method described below.

The determination unit 12 learns a classification rule for the labeled ordered trees based on the instances stored in the instance storage unit 20 with a certain learning algorithm such as that provided by Support Vector Machine. When a certain unknown labeled ordered tree is input, the determination unit 12 classifies it based on the learned classification rule and outputs the classification result. While learning, the determination unit 12 can successively acquire computation results of the inner products of further instances via the inner product computing unit 11. Thus, the amount of learning increases with the inner products of more instances being acquired, which enhances accuracy of classification. If the number of instances for learning stored in the instance storage unit 20 is fixed and is not enormous, the determination unit 12 may determine the determination rule after the inner products of all instances are computed by the inner product computing unit 11.

The instance storage unit 20 stores the instances of labeled ordered trees to be learned by the determination unit 12 in the processing section 10 as two classes: positive instances and negative instances.

In this embodiment, a Kernel method such as Support Vector Machine is used for learning conducted by the determination unit 12 in the processing section 10.

The basic idea for the classification learning of the labeled ordered trees addressed in this embodiment is as follows: list all possible substructures in an instance up to a certain degree of complexity; represent the instance as a vector using the number of appearances of each substructure in the instance as an attribute; and pass the vector representation to the learning algorithm.

Here, in order to internally access the instances, the Kernel method does not directly access the vector representation of an instance but only uses the inner product of certain two instances. That is, letting the vector representations (high dimensional) of the two instances be $o_1$ and $o_2$, only the inner product $<o_1, o_2>$ appears in the learning and recognition processes of the learning algorithm, and they never appear independently. Therefore, however high the dimension is (even if the dimension is infinite), the dimension does not appear explicitly. Given an efficient way of computing the inner product $<o_1, o_2>$, explicit computation in a high dimensional space is not required.

In addition, the upper limit of generalization error does not rely on the dimension. This avoids the curse of dimensionality, a common problem of classification in a high dimensional space.

In this embodiment, this Kernel method is applied to the labeled ordered trees. The Kernel for the tree structures takes into account all possible subtrees in a tree (instance) and uses the number of appearances of each subtree in the tree as an attribute.

FIG. 3 illustrates a tree (FIG. 3(A)) and possible subtrees in the tree (FIG. 3(B)) in the case of a syntactic analysis tree.

The main points of this Kernel are as follows. The vector representations of two trees $T_1$, and $T_2$ are represented as:

$$T = (\#subtree_1(T), \#subtree_2(T), \#subtree_3(T), \ldots) \quad \text{[Formula 1]}$$

where $subtree_1, subtree_2, \ldots$ are substructures (subtrees) that possibly appear in the tree.

Then, their inner product <$T_1, T_2$> is represented as:

$$\langle T_1, T_2 \rangle = \sum_i (\#subtree_i(T_1)) \cdot (\#subtree_i(T_2))$$ [Formula 2]

$$= \sum_{n_1 \in N_1} \sum_{n_2 \in N_2} \sum_i I_{subtree_i}(n_1) \cdot I_{subtree_i}(n_2)$$

$$= \sum_{n_1 \in N_1} \sum_{n_2 \in N_2} C(n_1, n_2)$$

where $N_1$ and $N_2$ are sets of nodes in the trees $T_1$ and $T_2$ respectively. $I_{subtree_i}(n_1)$ represents the number of appearances of the subtree$_i$ in the tree $T_1$ under a root node $n_1$. $C(n_1, n_2)$ is the number of subtrees that appear in both trees $T_1$ and $T_2$ under root nodes $n_1$ and $n_2$. That is, $C(n_1, n_2) = \Sigma_i I_{subtree}(n_1) \cdot I_{subtree_i}(n_2)$. Then, the inner product <$T_1, T_2$> can be computed without direct access to the vector representations of large size in the following manner.

The inner product <$T_1, T_2$> is computed recursively from leaves (leaf nodes of the tree) with dynamic programming in different manners for the three cases:
(1) when $n_1$ and $n_2$ has been generated with different generation rules;
(2) when $n_1$ and $n_2$ has been generated with the same generation rule and are both preterminals; and
(3) when $n_1$ and $n_2$ has been generated with the same generation rule and not both of them are preterminals.

Now, the case where a substructure (subtree) further includes lower substructures (the above case (3)) will be discussed.

If the tree to be processed does not have a node that shares a label with a brother node, like a syntactic analysis tree, the same generation rule has generated child node sets of both $n_1$ and $n_2$. Therefore, one-to-one correspondences between the child node sets can be uniquely determined, and the number of subtrees that appears in both $n_1$ and $n_2$ can be recursively counted.

On the other hand, for a more general tree like a labeled ordered tree addressed in this embodiment, such one-to-one correspondences between child node sets cannot be uniquely determined. Therefore, all possible correspondences have to be considered.

However, since the child nodes in the labeled ordered tree is in fixed order, only one-to-one correspondences in which the order of the child nodes is maintained need to be considered. That is, if the $i_1$th child node of the node $n_1$ corresponds to the $i_2$th child node of the node $n_2$, and the $j_1$th child node of the node $n_1$ corresponds to the $j_2$th child node of the node $n_2$, what should be considered is only the cases where $i_1 < j_1$ and $i_2 < j_2$ hold. Under this condition, an efficient algorithm that can consider all cases can be designed with dynamic programming.

FIGS. 4 and 5 are flowcharts describing a routine to compute the inner product <$T_1, T_2$>.

Initially, the inner product computing unit 11 in the processing section 10 receives the two labeled ordered trees $T_1$ and $T_2$ as an input from the instance storage unit 20. The nodes in the labeled ordered trees $T_1$ and $T_2$ are numbered in post order. In the following description, the symbol ":=" denotes an assignment operation, and |$N_1$| denotes the number of nodes in the tree $T_1$, while |$N_2$| denotes the number of nodes in the tree $T_2$.

Once the labeled ordered trees $T_1$ and $T_2$ are input, the inner product computing unit 11 selects the nodes $n_1$ and $n_2$ that comes first in the numbers of post order mentioned above for processing ($n_1=1$, $n_2=1$) (step 401 and 402). Then, it checks whether the nodes $n_1$ and $n_2$ have different labels, i.e., whether the nodes apply to the above case (1) (step 403). If they have different labels, i.e., if they apply to the case (1), then $C(n_1, n_2)$ is set as follows (step 404).

$$C(n_1, n_2):=0$$

This result is stored in a certain area of the main memory 103.

If the nodes $n_1$ and $n_2$ have the same label and they do not apply to the case (1), then the inner product computing unit 11 checks whether the nodes $n_1$ and $n_2$ are both leaves of the labeled ordered trees $T_1$ and $T_2$, i.e., whether they apply to the above case (2) (step 405). If they are both leaves, i.e., if they apply to the case (2), then $C(n_1, n_2)$ is set as follows (step 406).

$$C(n_1, n_2):=1$$

This result is stored in a certain area of the main memory 103.

If at least one of the nodes $n_1$ and $n_2$ is not a leaf (not a leaf node), i.e., if they do not apply to the case (2), they apply to the above case (3). Then, a subroutine shown in FIG. 5 computes $C(n_1, n_2)$ (step 407).

Here, processing in the case (3) will be described with reference to FIG. 5. In the following description, $S(i, j)$ denotes the number of subtrees that appear in both nodes $n_1$ and $n_2$ within the range of the 1st-ith child nodes in the node $n_1$ and 1st-jth child nodes in the node $n_2$. In addition, $nc(n_1)$ denotes the number of child nodes in the node $n_1$, and $ch(n_1, i)$ denotes the ith child node in the node $n_1$.

Firstly, the inner product computing unit 11 initializes the parameter i and j ($i=0$, $j=0$) (step 501 and 502). Then, it checks whether $i=0$ and whether $j=0$ (step 503). If either i or j is 0, then $S(i, j)$ is set as follows (step 504).

$$S(i, j):=1$$

This result is stored in a certain area of the main memory 103.

On the other hand, if neither i nor j is 0, then $S(i, j)$ is set as follows (step 505).

$$S(i, j):=S(i-1, j)+S(i, j-1)-S(i-1, j-1)+S(i-1, j-1) \cdot C(ch(n_1, i), ch(n_2, j))$$

This result is stored in a certain area of the main memory 103.

After computing $S(i, j)$ at step 504 or 505, the inner product computing unit 11 checks the value of the parameter j. If $j \neq nc(n_2)$ it increments the value of j by one and returns to step 503 (step 506 and 507). On the other hand, if $j=nc(n_2)$, then it checks the value of the parameter i. If $i \neq nc(n_1)$, it increments the value of i by one and returns to step 502 (step 508 and 509).

This processing is recursively repeated until all combinations of the child nodes in the nodes $n_1$ and $n_2$ are processed.

If $i=nc(n_1)$ at step 508, all combinations of the child nodes have been processed. The inner product processing unit 11 then uses the results of step 504 and 505 stored in the main memory 103 to set $C(n_1, n_2)$ as follows (step 510).

$$C(n_1, n_2):=S(nc(n_1), nc(n_2))$$

This result is stored in a certain area of the main memory 103. Then, the process returns to the routine of FIG. 4.

Once $C(n_1, n_2)$ is determined through step 404, step 406, or the subroutine of FIG. 5 (step 407), the inner product computing unit 11 checks the label of the node $n_2$. If $n_2 \neq |N_2|$, it increments the value of $n_2$ by one and returns to step 403. (step 408 and 409). On the other hand, if $n_2=|N_2|$, then it checks the label of the node $n_1$. If $n_1 \neq |N_1|$, it increments the value of $n_i$ by one and returns to step 402. (step 410 and 411).

This processing is recursively repeated until all combinations of the nodes in the labeled ordered trees $T_1$ and $T_2$ are processed.

If $n_1=|N_1|$ at step 410, all combinations of the nodes $n_1$ and $n_2$ have been processed. The inner product processing unit 11 then sums $C(n_1, n_2)$ for all of $n_1=1, \ldots, |N_1|$ and $n_2=1, \ldots, |N_2|$ using the results of step 404, 406, and 407 (510) stored in the main memory 103. Then it outputs the sum, which is the computation result of the inner product $<T_1, T_2>$ (step 412). This computation result of the inner product $<T_1, T_2>$ is temporarily stored in a certain area of the main memory 103 to be passed to the determination unit 12. The determination unit 12 reads the computation result of the inner product $<T_1, T_2>$ from the main memory 103 and learns the classification rule for the given labeled ordered trees $T_1$ and $T_2$ based on the computation result. This classification rule is stored in the main memory 103 for example, and used in classifying unclassified labeled ordered trees.

FIG. 6 illustrates an algorithm to compute the Kernel for the two labeled ordered trees $T_1$ and $T_2$ described above.

Now, the computational complexity in the above described Kernel computation is analyzed. The computational complexity for any $C(n_1, n_2)$ is proportional to the product of the number of child nodes in the node $n_1$ and the number of child nodes in the node $n_2$. The Formula 3 below shows that the computational complexity of the Kernel for labeled ordered trees is proportional to the product of the sizes of two trees.

$$\sum_{n_1 \in N_1} \sum_{n_2 \in N_2} O(nc(n_1) \cdot nc(n_2)) = \sum_{n_1 \in N_1} O(nc(n_1)) \cdot \sum_{n_2 \in N_2} O(nc(n_2))$$

$$= O(|N_1| \cdot |N_2|)$$

[Formula 3]

In this manner, the Kernel for labeled ordered trees can be used for learning by the determination unit 12 in the processing section 10. This enables the processing section 10 to be configured as a classifier in polynomial time, such that, given a positive instance set and a negative instance set of labeled ordered trees, the classifier classifies the labeled ordered trees based on their substructures.

Then, if an unknown labeled ordered tree is input to the processing section 10, the inner product computing unit 11 in the processing section 10 computes the inner product of the unknown labeled ordered tree and an appropriate labeled ordered tree used for learning, and the determination unit 12 classifies the unknown labeled ordered tree based on the classification rule stored in the main memory 103, for example, and the inner product computation result.

This method covers labeled ordered trees, which means that it also covers most types of data that can be represented as tree-form relations, including semistructured data represented in XML and HTML. Data written in XML, etc., will increase in future, and if characteristics of data can be adequately represented in XML, the data can be used as an instance in classification.

Now, two variations that expand the above described Kernel method employed by the processing section 10 will be described.

<First Variation>

In the above described Kernel method, exact appearances of a certain subtree in a tree structure are determined. A first variation expands this determination to allow some label differences.

FIG. 7 describes correspondence between subtrees in the first variation.

In FIG. 7, when it is determined whether a subtree$_i$ appears at a certain part in a tree T, the shaded nodes are regarded as the nodes with different labels. Then, when the number of appearances of the subtree$_i$ in the tree T is counted, penalties for the label differences are imposed on the count (i.e., the count is reduced).

Let $\Sigma$ be a set of labels, and $f:\Sigma \times \Sigma \rightarrow [0, 1]$ be a score function for a label difference. For $\forall l_1, l_2 \in \Sigma$, smaller $f(l_2, |l_1)$ indicates a larger penalty for the difference from $l_1$ to $l_2$. If $f(A|A)=1$, $f(A|D)=0.5$, $f(C|B)=0.8$, and $f(C|C)=1$, the score is defined by the product of them, thus $f(A|A) f(A|D) f(C|B) f(C|C)=0.4$. The ith element in the vector representation of the tree T is defined as the sum of the scores of all parts across the nodes of the tree T where the structure of the subtree$_i$ matches.

FIG. 8 illustrates an algorithm to compute the Kernel that allows for label differences according to the first variation.

Comparing with FIG. 6, FIG. 8 is modified in the underlined parts:

$$C(n_1, n_2):=\text{Sim}(n_1, n_2)$$

$$C(n_1, n_2):=\text{Sim}(n_1, n_2) \cdot S(nc(n_1), nc(n_2))$$

where $\text{Sim}(n_1, n_2)$ is a value represented as:

$$\text{Sim}(n_1, n_2) = \sum_{a \in \Sigma} f(n_1 | a) f(n_2 | a)$$

[Formula 4]

Computing the sum for all labels is for considering all possible differences.

<Second Variation>

A second variation further loosens the determination of subtree appearances, so that an appearance of a subtree is counted as long as the subtree is embedded in a tree with its relative node positions maintained. That is, the second variation allows for structural extension.

FIG. 9 describes correspondence between subtrees in the second variation.

In FIG. 9, a subtree$_i$ that appears in a tree T is embedded at the shaded node as illustrated. That is, a descendant node of another node in the subtree$_i$ should maintain the relation with that node in the embedded form in the tree T as well. Similarly, a node at the left of another node in the subtree$_i$ should maintain the relation with that node in the embedded form in the tree T as well.

FIG. 10 illustrates an algorithm to compute the Kernel that allows for structural extension according to the second variation.

In this algorithm, a new variable $C_a(n_1, n_2)$ is introduced, which is defined as:

$$C_a(n_1, n_2) = \sum_{n_a \in N_{n_1}} \sum_{n_b \in N_{n_2}} C(n_a, n_b) \quad \text{[Formula 5]}$$

where $N_{ni}$ is a set of a node $n_i$ and its all descendant nodes. If structural extension is not allowed, each subtree under a certain root node is a combination of lower subtrees under each child node of the certain root node, with the child node added atop of the combination. On the other hand, if structural extension is allowed, each subtree under a certain root node is a combination of subtrees under each descendant node of the certain root node, with the descendant node added atop of the combination.

Therefore, $C_a$ also has to be computed recursively with the recursive formula:

$$C_a(n_1, n_2) = \sum_{j=1}^{nc(n_2)} C_a(n_1, ch(n_2, j)) + \sum_{i=1}^{nc(n_1)} C_a(ch(n_1, i), n_2) - \sum_{j=1}^{nc(n_2)} \sum_{i=1}^{nc(n_1)} C_a(ch(n_1, i), ch(n_2, j)) + C_a(n_1, n_2) \quad \text{[Formula 6]}$$

Using this recursive formula, the Kernel that allows for structural extension in determining subtree appearances can be computed with the same computational complexity.

FIG. 11 illustrates an exemplary configuration of a learning machine according to this embodiment.

Referring to FIG. 11, the learning machine 1110 is connected to an instance set database 1120 that stores a set of labeled ordered trees classified as positive instances and negative instances, and to an unclassified database 1130 that stores a set of labeled ordered trees to be classified. The learning machine 1110 corresponds to the determination unit 12 in the processing section 10 in this embodiment, and the instance set database 1120 corresponds to the instance storage unit 20.

The learning machine 1110 includes a classification learning algorithm 1111 for classification learning of the labeled ordered trees and builds a classifier 1112 as the result of the learning.

Using the classification learning algorithm 1111, the learning machine 1110 accesses and learns the instance set database 1120 through the Kernel in the inner product computing unit 11 according to this embodiment and builds (outputs) the classifier 1112 that has a classification rule resulting from the learning.

The generated classifier 1112 accesses the unclassified database 1130 and the instance set database 1120 through the Kernel in the inner product computing unit 11. Then, it classifies the instances not known to be positive or negative (unclassified instances) stored in the unclassified database 1130 and outputs the result.

As an application of this embodiment, the learning machine as described above can build a classifier that classifies web pages on the Internet based on the page layouts.

Automatic classification of web pages is an important technique underlying web page filtering and categorization. Conventionally, web pages have been classified based on words that appear in a text, or links between pages. In the present embodiment, web pages can be classified based on structures of HTML documents that constitute the pages. Since the structure of an HTML document is reflected in the layout of the web page, this embodiment enables classification based on page layouts, which cannot be distinguished at the level of words or the like.

As another application of this embodiment, classification as one of the basic techniques of data mining can be performed on a semistructured database that contains objects represented as semistructured data such as XML data.

So far, the mainstream of databases has been relational databases. However, besides such databases with objects represented as relational data, databases with objects represented as semistructured data such as XML data will increase as XML becomes popular. Because this embodiment enables classification of such semistructured databases based on the structures of the object data, it provides an extremely effective tool for search and other processing on such databases.

Now, an application technique of the above described labeled ordered tree classification will be described.

When extracting desired information from semistructured data such as XML or HTML data, it may be required to solve a problem of indicating a particular node of a labeled ordered tree representing the semistructured data.

This problem can be translated into a problem of classifying trees into a class of trees with a mark at a correct position (node) (positive instances) and a class of trees with a mark at an incorrect position (negative instances). Then, the above described learning and classification technique of the information processing system according to this embodiment can be applied to this problem.

Specifically, tree structures with a mark at a correct position are learned from instances of marked trees, and the classifier is built. Then, an unmarked tree to be classified is marked in an appropriate manner. If the classifier classifies this marked tree as positive, it outputs the tree with the mark at the correct position as the result of node indication.

FIG. 12 illustrates an exemplary configuration of a learning system for building a node indicator that indicates a particular node of a labeled ordered tree according to this embodiment.

In FIG. 12, the learning machine 1210 is connected to an instance set database 1220 that stores a set of labeled ordered trees classified as positive instances and negative instances, and to a node indication database 1230 that stores a set of unmarked labeled ordered tree instances for which a node is to be indicated.

The learning machine 1210 corresponds to the determination unit 12 in the processing section 10 in this embodiment. It includes a node indication learning algorithm 1211 for classification learning of labeled ordered trees for node indication and builds a node indicator 1212 as the result of the learning. The generated node indicator 1212 has functionality of a classifier for an unclassified labeled ordered tree, so that it marks a correct position in the labeled ordered tree and outputs it as the result of node indication.

Now, the node indication method in this system will be described in detail. In this system, for a labeled ordered tree to be processed (i.e., without a node indication mark), instances of the tree are initially generated by provisionally marking the nodes of the tree. Each instance has a mark at a different node of the labeled ordered tree, that is, as many instances as the nodes of the tree are generated. Then, the node indicator 1212 classifies the instances as positive or negative with its classification functionality. The instance classified as positive is the instance having the mark at a correct position. Therefore, a node indication mark is added to the corresponding position in the labeled ordered tree to reflect this classification result. If more than one instance is determined as positive, it means that more than one node should be indicated, so that all such positions are reflected in the labeled ordered tree.

FIG. 13 is a flowchart describing operation in the learning phase of the learning machine 1210 shown in FIG. 12.

As shown in FIG. 13, a set Tp of labeled ordered trees with a mark at a correct position is initially input to the database 1220 (step 1301). Then, based on the labeled ordered trees that constitutes the set Tp, a set Tn of labeled ordered trees with a mark at an incorrect position is generated with certain processing means provided by the program-controlled CPU 101 (step 1302).

This is done by changing the marked positions in the labeled ordered trees in the set Tp, for example.

Then, with certain means provided by the program-controlled CPU 101, a positive instance set Ep in the form used in this system is generated from the set Tp of the correctly marked labeled ordered trees, and a negative instance set $E_n$ in the form used in this system is generated from the set Tn of the incorrectly marked labeled ordered trees. These two sets are stored in the instance set database 1220 (step 1303). Each instance included in the positive instance set Ep and the negative instance set En is generated by inserting a special node between the marked node and its parent node of each labeled ordered tree in the labeled ordered tree sets Tp and Tn (see FIG. 14).

Using the node indication learning algorithm 1211, the learning machine 1210 accesses and learns the instance set database 1220 through the Kernel included in the inner product computing unit 11 according to this embodiment and builds the classifier that has a classification rule resulting from the learning. Then, the learning machine 1210 builds (outputs) the node indicator 1212 that has the functionality of this classifier (step 1304). The classification rule is stored in the main memory 103 for example, and used in processing by the node indicator 1212.

FIG. 15 is a flowchart describing operation performed by the node indicator 1212 built with the procedure of FIG. 13.

As shown in FIG. 15, a set Tu of unmarked labeled ordered trees to be processed is initially stored in the node indication database 1230 (step 1501). Then, with certain means provided by the program-controlled CPU 101, instances having a provisional mark at a certain node are generated for each labeled ordered tree in the set Tu (step 1502).

The node indicator 1212 executes the following processing for each labeled ordered tree in the set Tu. Firstly, the node indication database 1230 and the instance set database 1220 are accessed through the Kernel included in the inner product computing unit 11, and the instances generated at step 1502 are classified as positive or negative based on the classification rule stored in the main memory 103 (step 1503 and 1504). Then, a node indication mark is added to the nodes in the labeled ordered tree that corresponds to these instances to reflect the marked positions in all instances classified as positive, and the labeled ordered tree is output (step 1505). When the processing from step 1503 to 1505 is performed for all labeled ordered trees in the set Tu, the processing terminates (step 1506).

Thus, with the node indicator 1212 for labeled ordered trees according to this embodiment, nodes to be marked for label indication are determined based on the structure around each node that constitutes the labeled ordered trees. Therefore, as opposed to conventional methods such as learning paths from the root or using Relational Learning, this method provides efficiency and theoretically good generalization performance.

As described above, this invention enables classification of semistructured data with the Kernel method for labeled ordered trees.

The invention claimed is:

1. A data processing method for controlling a computer to classify XML semi-structured data instances in a database, said XML semi-structured data instances each having a vector representable structure having vector representable substructures as attributes, the method comprising: a first step of inputting the vector representable structure instances including their substructure instances; and a second step of successively computing an inner product of successive vector representable structure instances including their substructure instances and storing the successively computed inner products, the method further comprising the steps of: based on structures of positive instances and structures of negative instances stored in memory, obtaining a classification rule for classifying the positive instances and the negative instances and storing the classification rule in memory, each structure of the positive instances being a labeled ordered tree in which a node indication mark is added to a node to be indicated, and each structure of the negative instances being a labeled ordered tree in which a node indication mark is added to a node not to be indicated; adding a node indication mark to a node in the labeled ordered tree to be processed and classifying the labeled ordered tree as positive or negative based on the classification rule stored in the memory; and in response to the classification result, outputting a processing result of the labeled ordered tree with the node indication mark added to a node, to thereby create a classification rule; wherein the first step further comprises, if the given substructures includes lower substructures, computing a sum of matches for the substructures.

2. The data processing method according to claim 1, wherein the first step comprises, if the given substructures includes lower substructures, computing a sum of complete matches for the lower substructure by applying dynamic programming based on information specific to the lower substructure.

3. The data processing method according to claim 1, wherein the first step comprises, if the given substructures includes lower substructures, computing a sum of matches for the lower substructure according to correspondence in which order in the lower substructures is maintained.

4. The data processing method according to claim 1, wherein the second step comprises inputting instances having a labeled ordered tree structure.

5. The data processing method according to claim 1 wherein the step of obtaining the classification rule and storing it in the memory comprises the steps of: inputting the labeled ordered trees to compute their inner product and storing the computation result in memory; and obtaining the classification rule for the labeled ordered trees with the computation result stored in the memory.

6. The method of claim 1 further comprising controlling a computer to compute an inner product of labeled ordered trees, the method comprising: a first step of matching leaf nodes of the labeled ordered trees and storing the result in memory; a second step of matching nonleaf nodes of the labeled ordered trees by computing a sum of matches for descendant nodes of the nonleaf nodes and storing the result in memory; and a third step of computing the inner product of the labeled ordered trees based on the matching results of the first and second steps stored in the memory.

7. The data processing method according to claim 6, wherein the second step comprises computing a sum of matches for the descendant nodes by applying dynamic programming according to correspondence in which order of the descendant nodes is maintained.

8. A program product encoded on a computer readable meddium and comprising code for controlling a computer to execute classifying XML semi-structured data instances in a database, said XML semi-structured data instances each having a vector representable structure having vector representable substructures as attributes, the method comprising: a first step of inputting the vector representable structure instances including their substructure instances; and a second step of successively computing an inner product of successive vector representable structure instances including their substructure instances and storing the successively computed inner products, the method further comprising the steps of; based on structures of positive instances and structures of negative instances stored in memory, obtaining a classification rule for classifying the positive instances and the negative instances and storing the classification rule in memory, each structure of the positive instances being a labeled ordered tree in which a node indication mark is added to a node to be indicated, and each structure of the negative instances being a labeled ordered tree in which a node indication mark is added to a node not to be indicated; adding a node indication mark to a node in the labeled ordered tree to be processed and classifying the labeled ordered tree as positive or negative based on the classification rule stored in the memory; and in response to the classification result, outputting a processing result of the labeled ordered tree with the node indication mark added to a node, to thereby create a classification rule; wherein the first step further comprises, if the given substructures includes lower substructures, computing a sum of matches for the substructures.

9. The program product according to claim 8, wherein the first step executed by the computer comprises, when computing the sum of matches for the descendant nodes of the node, determining that the descendant nodes match even if their labels are different from corresponding nodes.

10. The program product according to claim 8, wherein the first step executed by the computer comprises determining that the descendant nodes match if relative positions between corresponding nodes are maintained.

11. A computer readable recording medium in which a program for controlling a computer to classify XML semi-structured data instances in a database, said XML semi-structured data instances each having a vector representable structure having vector representable substructures as attributes, the method comprising: a first step of inputting the vector representable structure instances including their substructure instances; and a second step of successively computing an inner product of successive vector representable structure instances including their substructure instances and storing the successively computed inner products, the method further comprising the steps of: based on structures of positive instances and structures of negative instances stored in memory, obtaining a classification rule for classifying the positive instances and the negative instances and storing the classification rule in memory, each structure of the positive instances being a labeled ordered tree in which a node indication mark is added to a node to be indicated, and each structure of the negative instances being a labeled ordered tree in which a node indication mark is added to a node not to be indicated; adding a node indication mark to a node in the labeled ordered tree to be processed and classifying the labeled ordered tree as positive or negative based on the classification rule stored in the memory; and in response to the classification result, outputting a processing result of the labeled ordered tree with the node indication mark added to a node, to thereby create a classification rule; wherein the first step further comprises, if the given substructures includes lower substructures, computing a sum of matches for the substructures.

* * * * *